April 29, 1969     D. W. DARLAND     3,441,321
AUXILIARY NONMETALLIC CRAWLER TRACTOR OVERTRACK
Filed Dec. 30, 1966
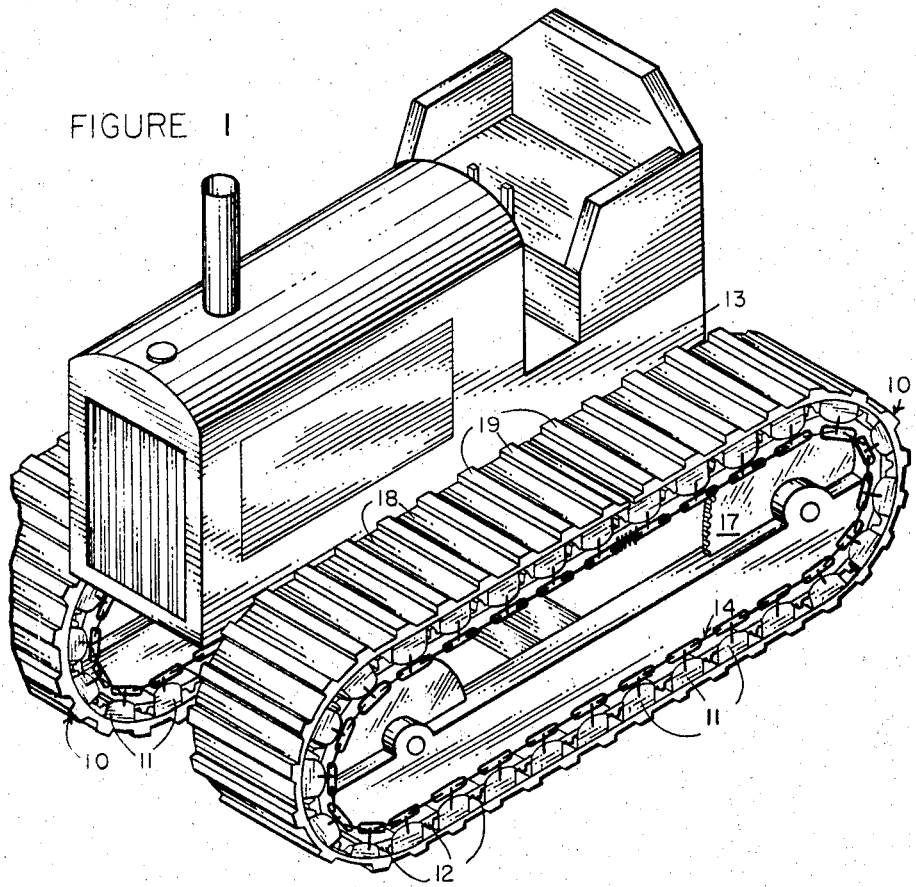
FIGURE 1
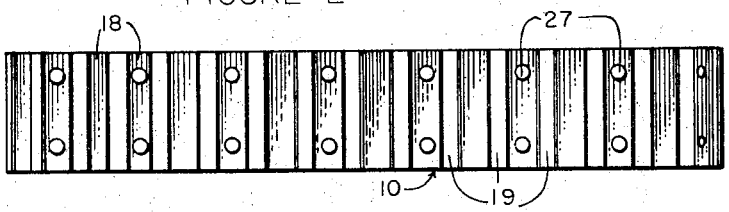
FIGURE 2
DAVID W. DARLAND
INVENTOR.
ATTORNEY

DAVID W. DARLAND
INVENTOR.
ATTORNEY

United States Patent Office 3,441,321
Patented Apr. 29, 1969

3,441,321
AUXILIARY NONMETALLIC CRAWLER TRACTOR OVERTRACK
David W. Darland, 5417 2nd Ave. S., Seattle, Wash. 98108
Filed Dec. 30, 1966, Ser. No. 606,137
Int. Cl. B62d 55/24
U.S. Cl. 305—35         1 Claim

ABSTRACT OF THE DISCLOSURE

A continuous overtrack releasably positionable about the principal track of a tractor to allow transit over improved structures without damage thereto. Bridge elements maintain the auxiliary overtrack at a spaced distance from outwardly projecting cleats of the principal track to prevent damage therefrom.

---

My invention relates generally to an auxiliary track that may be releasably positioned upon the ordinary metallic cleat track of a tractor of commerce to allow it to pass over improved structures, and particularly roadways, without causing damage thereto and more particularly to such a device that has a bridge-type supporting structure maintaining a rubber tread at a spaced distance from the metallic track.

Heretofore tracks having outwardly projecting metallic traction cleats have become common upon certain types of tractors and the use of such tractors in agriculture, engineering and commerce has required that they be moved on and over various improved structures, particularly on or across surfaced roadways. The passage of such vehicles over such improved structures has been found deleterious and, in some instances, aside from damage that might be caused thereby, various authorities have prohibited absolutely the passage of such vehicles over such structures.

In response to this problem various solutions have been offered, one class involving the placement of some sort of an auxiliary overstructure about the metallic track so as to present a broad flat surface for tractor travel over an improved structure and prevent any track cleats from making a damaging contact with the improved surface. Of such structures that are known, most have been so complex as to be not economically feasible and others have provided a contact between the metallic tractor tread and the overtrack that was so damaging to the overtrack that they have not been durable. With these thoughts in mind the instant invention was conceived to provide a new type overtrack that eliminates problems present in such structures heretofore known. In so doing it is:

A principal object of my invention to provide an auxiliary overtrack releasably positionable on a metallic cleat-type tractor tread of commerce, to allow a tractor with such overtrack to move over an improved structure without damaging it.

A further object of my invention to provide such a structure that includes an elongate bank-like tread supported by a plurality of bridge members communicating with the underlying metallic tractor track so that the band member of the overtrack is maintained out of contact with the sharp, protruding cleats of the underlying tractor pad to prolong its life.

A still further object of my invention to provide such a device that is securely maintained on a tractor tread during operation but yet readily placed upon and removed therefrom as desired.

A still further object of my invention to provide an overtrack structure of the nature aforesaid that is usable with many commercial types of track of commerce without modification.

A still further object of my invention to provide such an overtrack that is of new and novel design, of simple and economic manufacture, of rugged and durable nature, and otherwise well adapted to the uses for which it is intended.

These and other objects of my invention will become more apparent from a consideration of the following specification and the accompanying drawings which form a part of this application.

In carrying out the objects of my invention, however, it is to be understood that its essential features are susceptible of change in design and structural arrangement, with only one preferred practical embodiment being illustrated, as required.

In the accompanying drawings, wherein like numbers of reference refer to similar parts throughout:

FIGURE 1 is a generalized partial isometric view of a cleat-type tractor having my overtrack in place thereon.

FIGURE 2 is an orthographic top view of the overtrack of my invention, showing its configuration, parts, and their relationship and arrangement.

Figure 3:
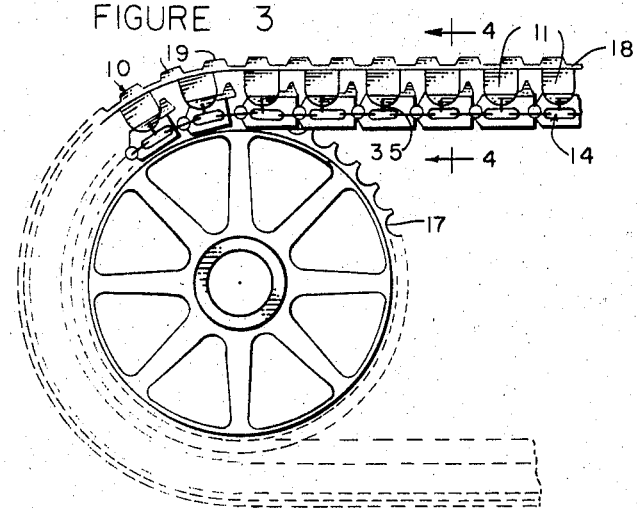
FIGURE 3 is a partial enlarged orthographic side view of the overtrack in place upon an ordinary metallic track carried upon a driving cog.
Figure 4:
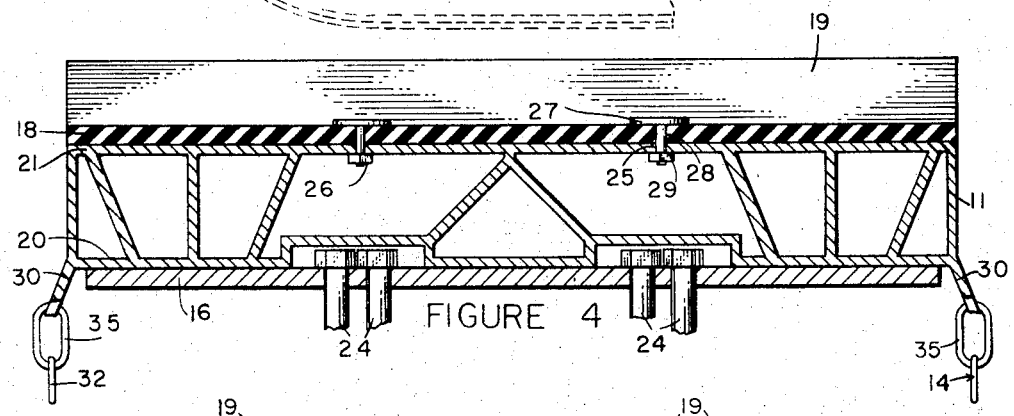
FIGURE 4 is a vertical cross-sectional view across the track showing the internal details of a bridging structure and the method of support of such structure upon the metallic cleat track.

Referring now to the drawings in greater detail, and particularly to FIGURE 1, it will there be seen that my invention comprises generally an endless flexible tread member 10 supported by a plurality of individual cross bridges 11 on the normal metallic cleat-type track 12 of tractor 13 and releasably maintained thereon by fastening chain 14.

The structure of most metallic cleat-type tread units of tractors of commerce is reasonably similar, embodying a laterally extending outwardly projecting cleat 15 supported by flat planar body 16. A plurality of such units are joined in a movable fashion to form an endless track 12 supported for motion on the tractor driving cogs 17. The relative proportioning of such tracks is reasonably standardized in the tractor industry though there is some variance in the lateral width of the tread depending upon the size of the particular tractor it is adapted to support.

The tread member 10 of my invention is a belt-like member formed of some reasonably durable, flexible material such as cloth impregnated with rubber, or the like. It is of a size and shape adapted to fit about a tractor tread for which it is to be used and should be of a width substantially the same as the tractor tread width. Preferably the member is formed with a belt-like body 18 supporting a plurality of substantially parallel spaced, laterally extending traction ridges 19, formed as an integral part of the whole strucutre. If desired, this tread member may carry cable reinforcing members of steel or similar material.

The bridge members 11 of my invention are rectangular, elongate, box-like structures adapted to support the belt body 18 at a spaced distance outwardly from the tractor tread 12. These members are preferably formed with a bottom plate 20, top plate 21 and communicating interior bridge network 22. Preferably all members are rigidly joined in the process of formation or thereafter by welding.

Bottom plate 22 is provided with appropriate indentations 23 to receive heads of the outwardly projecting bolts 24, common in many metallic tractor tracks so that the inward surface of plate 22 may rest on a substantial part of the outward surface of the body 16 of the tread unit.

Appropriate holes 25 are provided in bridge top member 21 to cooperate with similar holes 28 in body 18 of overtrack 10 to allow releasable joinder of bridge 11 to overtrack 10 by belt bolts 26 extending therethrough. These belt bolts preferably have a relatively large thin head 27 to provide a maximum fastening surface and are releasably held in position by nuts 29 threadedly engaged on their end portion on the underside of bridge top member 21. With this structure various individual elements of my invention may be changed or replaced when necessary.

Figure 5:
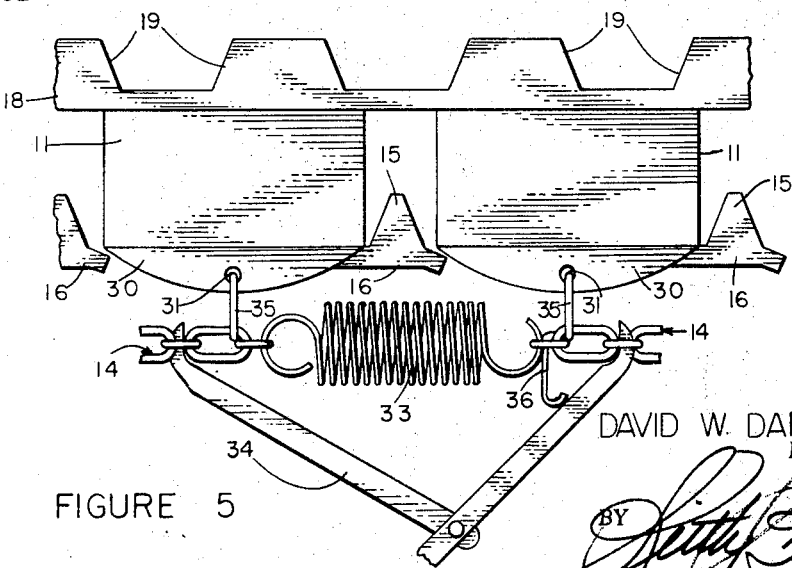
FIGURE 5 is a partial orthographic side view of my overtrack in place upon an ordinary metallic cleat track showing particularly the relationship of the bridges and the method of fastening the holding chain with a chain tightener of commerce.

The lateral extensions of bottom 20 of each bridge 11 has paired opposed inwardly turned fastening chain ears 30 with central hole 31 to allow communication by links 35 with fastening chain 32. This chain is of a length somewhat less than that of the overtrack 10, so that when the chain is fastened as a continuous unit, it will have a length somewhat less than the periphery about the metallic track 12 by reason of its positioning and will therefore maintain the overtrack member in position upon the metallic tractor track 12. This chain is preferably fastened to itself by means of an ordinary monkey link 36 and this fastening may more readily be accomplished if the two ends are maintained in communication by spring 33 and are brought into communication by means of a chain tightener of commerce 34 as illustrated in FIGURE 5. Such fastening devices and tightening devices are well known in the chain art.

The spacing of bridges 11 upon the inner surface of overtrack 10 is somewhat critical. Such member should be spaced at a distance of some three or four inches to allow the undersurface of the bridge to rest upon track member body 16 and allow track cleat 15 to project upwardly in the area between bridges. The height, or extension of the bridge away from the vehicle track, must also be such that the extension of the cleat in the same direction is not so great so that it will contact the inner surface of one track 10 to cause wear or physical deterioration thereof.

It is further to be noted that some looseness of fit and flexibility of the overtrack member is required for its operation as the metallic track is itself moveably connected and any auxiliary track must allow for the appropriate necessary motion of the metallic track 10. The bridging members must be constructed with some structural rigidity as they do support the weight of the tractor when between tread and ground and this is a substantial mass.

From the foregoing description of the structure of my invention, its operation may be understood. An overtrack is formed and constructed according to the foregoing description. To apply it, preferably it is laid out in linear fashion upon the ground in front of the tractor tracks and the tractor driven upon it until the tractor rests upon the overtrack. The ends of the overtrack 10 are then brought together and the fastening chains fastened to operatively position the overtrack. With the overtrack in place, the tractor may be moved over an improved structure with no fear of the metallic cleats damaging that structure. When desired, the tread may be removed in the same fashion by reversing the aforesaid operations, that is, releasing the fastening chain members, laying the overtrack down and running the tractor off the overtrack under its own power.

It is to be noted that at no time is there a direct communication between the relatively acute tractor cleats and the overtrack, but rather the cleats are maintained between bridge members where potential forces created by them can do no damage.

It is further to be noted that my overtrack allows motions of the various parts relative to each other and relative to the underlying track; were this motion not allowed for, motion of the tractor track would cause physical destruction of the overtrack.

Having thusly described my invention, what I desire to protect by Letters Patent, and

What I claim is:

1. An auxiliary overtrack of the nature aforesaid adapted for use over and supported by the principal metallic cleat track of a tractor to allow operation thereof over improved surfaces without damage by the tractor to such surfaces, comprising, in combination:

an elongate, belt-like overtrack member of length adapted to fit about the principal tractor track and width substantially equal to the width of the principal tractor track and having traction means associated therewith;

a plurality of bridge members carried at spaced intervals by the inner surface of the overtrack to communicate with the plate-like body of tread elements therebelow to support the overtrack member at a spaced distance outwardly from the underlying principal track member with the cleats of the underlying principal track member projecting into spaces between the bridge members; and means of releasably positioning the overtrack member upon the principal tractor track including paired opposed chains releasably joined to communicate in endless fashion with holes in the opposed inward lateral extensions of the bridge members, the total length of the chains being less than the peripheral distance about the principal track, so that the chains releasably maintain the overtrack in operative position on the principal track.

References Cited

UNITED STATES PATENTS

| | | | |
|---|---|---|---|
| 1,370,379 | 3/1921 | Straub | 305—51 X |
| 1,487,340 | 3/1924 | Kroupsky. | |
| 1,932,267 | 10/1933 | Francis. | |
| 2,044,918 | 6/1936 | Schmeiser | 305—51 |
| 2,264,135 | 11/1941 | Kaminsky | 305—51 X |
| 2,329,582 | 9/1943 | Bishop | 305—35 |
| 2,969,258 | 1/1961 | Murray. | |

RICHARD J. JOHNSON, *Primary Examiner.*

U.S. Cl. X.R.

305—51